(12) United States Patent
Cordonnier et al.

(10) Patent No.: US 8,850,831 B2
(45) Date of Patent: Oct. 7, 2014

(54) METHOD FOR COOLING GRANULAR SOLID MATERIALS, AND CONTINUOUS CURING FACILITY AS SUCH

(75) Inventors: Alain Cordonnier, Villeneuve d'Ascq (FR); Sebastien Devroe, Villeneuve d'Ascq (FR); Yan Huerre, Villeneuve d'Ascq (FR)

(73) Assignee: Fives FCB, Villeneuve d'Ascq (FR)

( * ) Notice: Subject to any disclaimer, the term of this patent is extended or adjusted under 35 U.S.C. 154(b) by 386 days.

(21) Appl. No.: 13/392,239

(22) PCT Filed: Sep. 30, 2010

(86) PCT No.: PCT/FR2010/000649
§ 371 (c)(1),
(2), (4) Date: Feb. 24, 2012

(87) PCT Pub. No.: WO2011/042618
PCT Pub. Date: Apr. 14, 2011

(65) Prior Publication Data
US 2012/0151945 A1 Jun. 21, 2012

(30) Foreign Application Priority Data

Oct. 8, 2009 (FR) ...................................... 09 04812

(51) Int. Cl.
*C04B 7/47* (2006.01)
*F27B 7/20* (2006.01)
*F27B 7/38* (2006.01)
*C04B 7/44* (2006.01)

(52) U.S. Cl.
CPC ................. *F27B 7/383* (2013.01); *C04B 7/475* (2013.01); *F27B 7/20* (2013.01); *C04B 7/4415* (2013.01)
USPC ............................................................ 62/65

(58) Field of Classification Search
CPC .......... C04B 7/4415; F27B 7/20; F27B 7/383
USPC .................................. 62/63, 65, 91, 314, 411
See application file for complete search history.

(56) References Cited

U.S. PATENT DOCUMENTS 3,189,460 A * 6/1965 Smith, Jr. ........................ 426/467
4,157,155 A * 6/1979 Smith ............................ 228/183

(Continued)

FOREIGN PATENT DOCUMENTS

CN        85106835 A     5/1986
CN         1044449 A     8/1990

(Continued)

OTHER PUBLICATIONS

Translation of Chinese Office Action, dated Jan. 13, 2014, from corresponding CN application.

(Continued)

*Primary Examiner* — Mohammad M Ali
(74) *Attorney, Agent, or Firm* — Young & Thompson

(57) ABSTRACT

Method for cooling granular solid materials from a continuous curing facility having at least one area for burning a fuel to cure granular materials, wherein the curing of the granular materials, then the cooling of the cured granular materials is carried out in two consecutive steps, a first cooling step in a first cooler and a second cooling step in a second cooler, the method including: providing a cold air source for cooling the granular materials, the cold air source directly supplying air to the second cooler by blowing, and the air heated by the cured granular materials being used during the cooling as combustion gas for the burning area. All gases generated by the first and second coolers are routed to the burning area for use as a combustion gas, and the amount of cold air blown to the second cooler is adjusted to cover the air combustion needs.

20 Claims, 4 Drawing Sheets

(56) References Cited

U.S. PATENT DOCUMENTS

Figure 1:
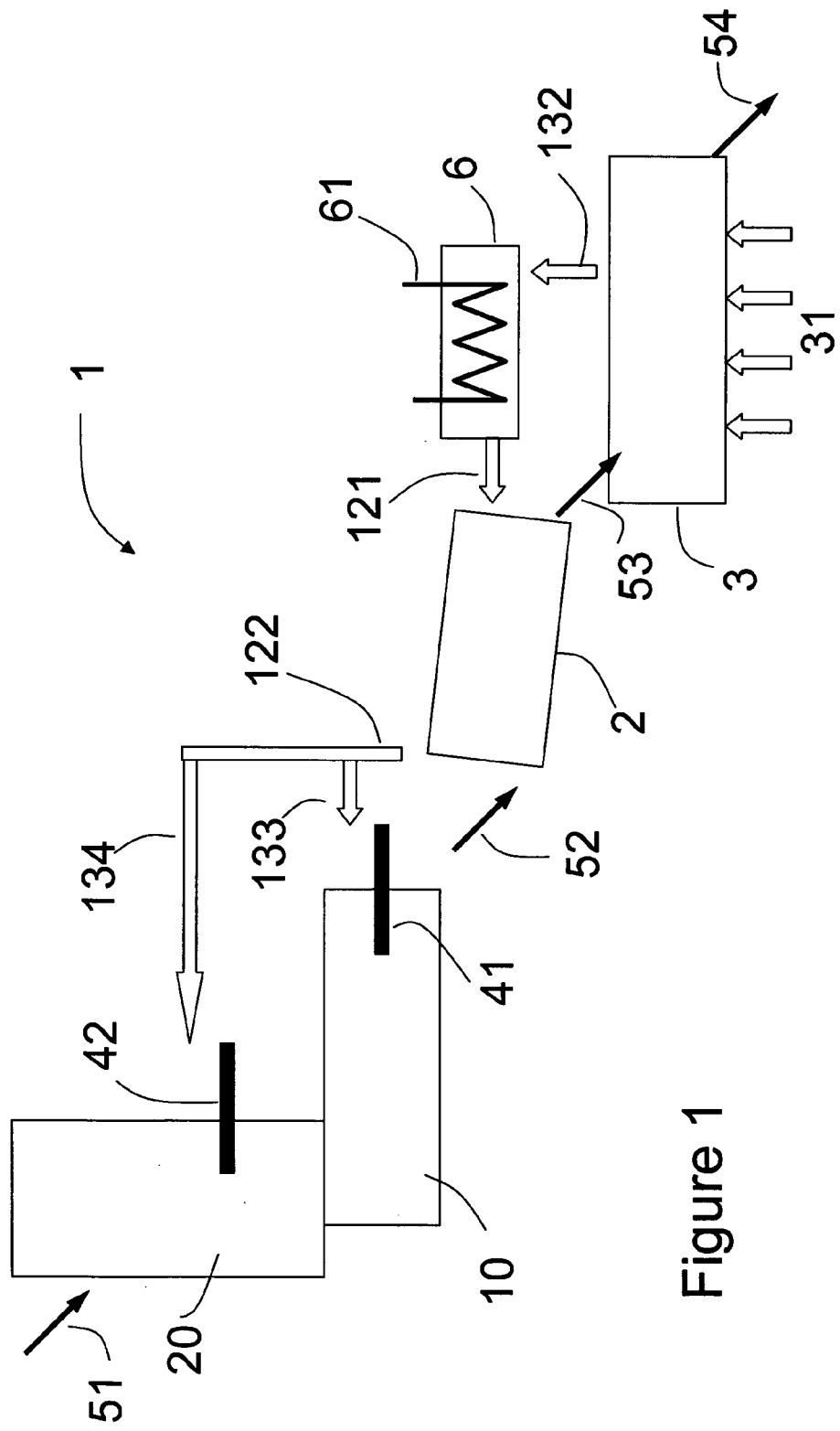

| | | | | |
|---|---|---|---|---|
| 4,217,128 A | * | 8/1980 | Stinson et al. | 71/29 |
| 4,260,585 A | * | 4/1981 | Noda et al. | 422/208 |
| 4,512,793 A | * | 4/1985 | Harrison | 71/29 |
| 4,541,367 A | * | 9/1985 | Lindberg | 123/25 M |
| 4,919,906 A | * | 4/1990 | Barber | 423/323 |
| 4,997,363 A | | 3/1991 | Hundebol | |
| 5,221,520 A | * | 6/1993 | Cornwell | 422/122 |
| 5,579,334 A | * | 11/1996 | Baxter et al. | 373/109 |
| 5,833,453 A | | 11/1998 | Doumet | |
| 6,051,201 A | * | 4/2000 | Barber | 423/322 |
| 6,291,736 B1 | * | 9/2001 | Pal et al. | 588/2 |
| 7,818,894 B2 | * | 10/2010 | Noyes et al. | 34/169 |
| 8,100,690 B2 | | 1/2012 | Mortensen et al. | |
| 8,647,113 B2 | | 2/2014 | Devroe et al. | |
| 2009/0094853 A1 | * | 4/2009 | Noyes et al. | 34/233 |

FOREIGN PATENT DOCUMENTS

| | | |
|---|---|---|
| CN | 1134922 A | 11/1996 |
| CN | 1208462 A | 2/1999 |
| CN | 1977136 A | 6/2007 |
| DE | 10 2006 026234 A1 | 12/2007 |
| EP | 0534225 A1 | 3/1993 |
| FR | 2931816 A1 | 12/2009 |
| GB | 2167740 A | 6/1986 |
| JP | 41011182 | 5/1966 |
| JP | S4867050 U | 8/1973 |
| JP | S4986418 A | 8/1974 |
| JP | S49125947 A | 12/1974 |
| JP | S5988348 A | 5/1984 |
| JP | S6287444 A | 4/1987 |
| JP | S62129685 A | 6/1987 |
| JP | H0654748 A | 3/1994 |
| WO | 9728408 A1 | 8/1997 |
| WO | 2007/141307 A2 | 12/2007 |

OTHER PUBLICATIONS

Translation of Japanese Office Action, dated Apr. 8, 2014, from corresponding JP application.

International Search Report, dated Mar. 1, 2011, from corresponding PCT application.

* cited by examiner

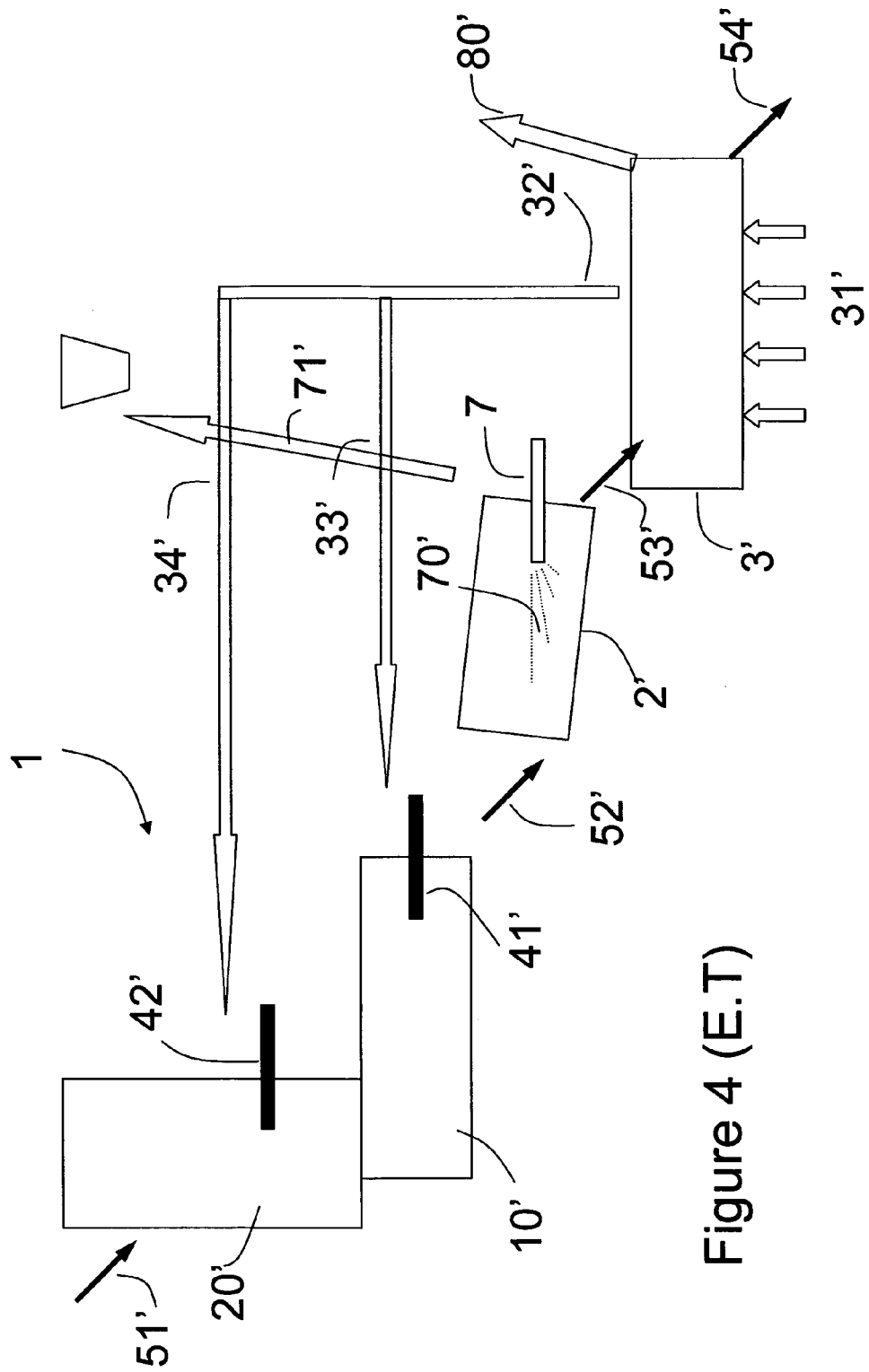
Figure 4 (E.T)

METHOD FOR COOLING GRANULAR SOLID MATERIALS, AND CONTINUOUS CURING FACILITY AS SUCH

The invention relates to a method for cooling granular solid materials, coming from a continuous curing facility, as well as to a continuous curing facility as such.

The invention will have a particular application, but not limited to, the manufacture of cement clinker.

In the mineral material treatment industries, such as for example the production of cement clinker, the operations of curing materials, the calcination step in particular, are generally followed by a cooling of the materials intended to render said materials able to be manipulated.

Generally, this cooling is implemented at least by the blowing of cold air over the hot materials.

In order to reduce the energy consumption of the facility, it is sought to recover the heat contained in the hot materials. Therefore during the cooling of the material, the heat contained in the material is transmitted to the blown air. The hot air produced as such is most often used as combustion air for the fuel which is used in the curing facility.

However, the current performance of coolers are such that the full cooling of the materials requires a quantity of air that generally exceeds the air combustion needs of the curing facility. For example, in the case of the production of cement clinker, about 1.8 to 2.2 $Nm^3$ of blown air is required per kg of material produced, when the air combustion needs are less than 1 $Nm^3$ per kg of material produced.

This excess air generates a discharge flow, (or excess flow) which requires a filtering facility and which consumes ventilation energy. The discharge flow carries with it a portion of the energy which is difficult to valorise due to the low temperature of said flow. It is known however from prior art facilities making it possible to recover a portion of the energy contained in this discharge flow: FR-08/03.050 is an example of this.

Among the techniques commonly used for cooling are the tubular, cylindrical, rotating coolers wherein the material circulates generally against the current of an air flow, and grate coolers, whereon a thick bed of material is displaced laterally while blown air passes through under the grate.

The cooling can sometimes, although infrequently, carried out by associating two technologies used in series. It is also known from prior art a method shown in this application and which shall be developed further, making it possible to cool the materials by the association in series of a tubular cooler and a grate cooler.

The materials are first cooled in the tubular cooler then, in the grate cooler. In order to increase the intensity of the cooling on the tubular cooler, water is injected on the hot materials thus producing water vapour. This evaporated water is not used as combustion gas and is conducted separately to a filtering device, the heat contained in this vapour being lost.

In such a facility, a single cold air source supplies the grate cooler, the quantity of cold air blown being over-abundant in relation to the air combustion needs of the facility. Only a portion of the heated air in the grate cooler is used as combustion air, with the other portion forming a discharge flow requiring adapted filtration and means of ventilation.

Prior art knows from DE 10 2006 026 234, or WO 2007 141 307, a facility for manufacturing cement clinker. According to an embodiment, shown in FIG. 2 in DE 10 2006 026 234, the granular materials at the output of the rotary furnace are cooled in a first section, then a second section of a bed cooler through which passes a cooling gas.

The first section can be cooled by a non-oxidising media. The second section is cooled by air. In order to save energy, this facility has a recirculating circuit of the non-oxidising media, heated by the granular materials, towards the first section of the cooler. To this effect, the heated non-oxidising media is cooled by a heat exchanger, filtered in order to separate the dusts, then routed at least partially to the first section of the cooler in order to be used again as a non-oxidising cooling media. A discharge duct on the recirculating circuit makes it possible to discharge the other portion of the media, after filtration, into the environment.

The heated air at the output of the second section of the cooler is also filtered (by a cyclone) in order to separate the dusts, then heated by said exchanger and is routed in order to be used as combustion gas for the facility.

Although this facility makes it possible to save energy, it has the disadvantage, as the aforementioned prior art, of requiring filtration devices such as cyclones in order to dedust the heated media gases, generated by said cooler.

The purpose of this invention is to overcome the aforementioned disadvantages by proposing a method for cooling granular solid materials, coming from a continuous curing facility, of which the energy consumption is optimised, while also reducing the number of pieces of equipment required for the facility, and as such, its cost.

More particularly, the objective of this invention is to proposer such a method, of which the facility does not have a discharge flow and does not require the filtration of a portion of the heated air in the coolers of the facility.

Another objective of the invention is to propose such a facility as such.

Other objectives and advantages of this invention shall appear during the description which shall follow, which is provided only for the purposes of information, and of which the purpose is not to restrict it.

The invention relates to a method for cooling granular solid materials coming from a continuous curing facility, having at least one area for burning a fuel for the curing of granular materials, wherein is carried out the curing of the granular materials in said facility then the cooling of said cured granular materials in two consecutive steps, a first cooling step implemented in a first cooler of the facility and a second cooling step implemented in a second cooler of the facility, method wherein:

a cold air source is provided for the cooling of the granular materials, said cold air source supplying directly said second cooler by air blowing, the air heated by the cured granular materials, during the cooling, is used as combustion gas for said at least one area for burning of the facility.

According to the method in accordance with the invention:

the totality of the gases generated by said first cooler and said second cooler is routed to at least one area for burning of said curing facility in order to be used as combustion gas, without filtration of said gases, the quantity of cold air blown to said second cooler is adjusted in such a way as to cover but not excessively the air combustion needs of the facility.

Routing the totality of the gases generated by the first cooler and the second cooler and adjusting the quantity of cold air blown to the second cooler in such a way as to cover but not excessively the air combustion needs of the facility make it possible as such to optimise the recovery of the energy contained in the hot material. In addition, these arrangements make it possible to prevent the presence of a discharge flow and as such means of ventilation and filtration devices associated with this discharge flow.

According to an advantageous embodiment, the temperature of the granular materials at the output of the second cooler is controlled by the intermediary of a heat sink.

Possibly, the heat sink makes it possible to control the temperature of the materials at the output of the first cooler.

Possibly, the temperature of the air exiting from the second cooler is lowered by means of an exchanger constituting at least in part said heat sink, before introducing the air cooled by said exchanger into said first cooler, as cooling air. The air exiting from the second cooler can be used in totality as cooling air to the first cooler.

Possibly, said heat sink can consists in said exchanger and the temperature of the granular materials at the output of said first cooler is determined by adjusting the flow of the cooling fluid of said exchanger.

According to an embodiment, the heat sink can be carried out by means in part by the water evaporation injected into said first cooler.

Possibly, the heat sink can consist in said water evaporation injected into said first exchanger and the temperature of the granular materials at the output of said first cooler is determined by adjusting the flow of the injected water.

Possibly, in addition to the injected water, the cooling fluid to the first cooler is constituted by a portion of the air exiting from said second cooler.

According to an embodiment, the injected water can form the only cooling fluid used in said first cooling step to said first cooler. In this case, the evaporated water of said first cooler is mixed with a portion at least of the heated air exiting from said second cooler before using the wet air mixture as combustion air in said facility.

Said first cooler can possible be a tubular cooler comprising a rotating cylinder wherein the material circulates and the second cooler a grate cooler wherein a thick bed of materials is displaced laterally on the grate with blown air passing through under the grate.

The invention also relates to a continuous curing facility having at least one area for burning a fuel for the curing of granular solid materials wherein the granular materials are cooled in two consecutive steps, a first cooling step being implemented in a first cooler of the facility, and a second cooling step being implemented in a second cooler of the facility. Said facility has a cold air source for the cooling of the materials supplying directly said second cooler.

According to the invention, said facility has:
gas ducts making it possible to route the totality of the hot gases generated by said first cooler and said second cooler towards said at least one area for burning of said facility, without filtration of said gases,
means for adjusting the quantity of cold air blown to said first cooler in such a way as to cover but not excessively the air combustion needs of said facility.

According to an embodiment, the facility has a heat sink able to allow for the control, and even the adjusting of the temperature of the granular materials at the output of said first cooler.

The heat sink can include an exchanger making it possible to cool the gases exiting from the second cooler before using the gases cooled by the exchanger to said first cooler as cooling air.

The heat sink can include means for injecting water into said first cooler.

Figure 2:
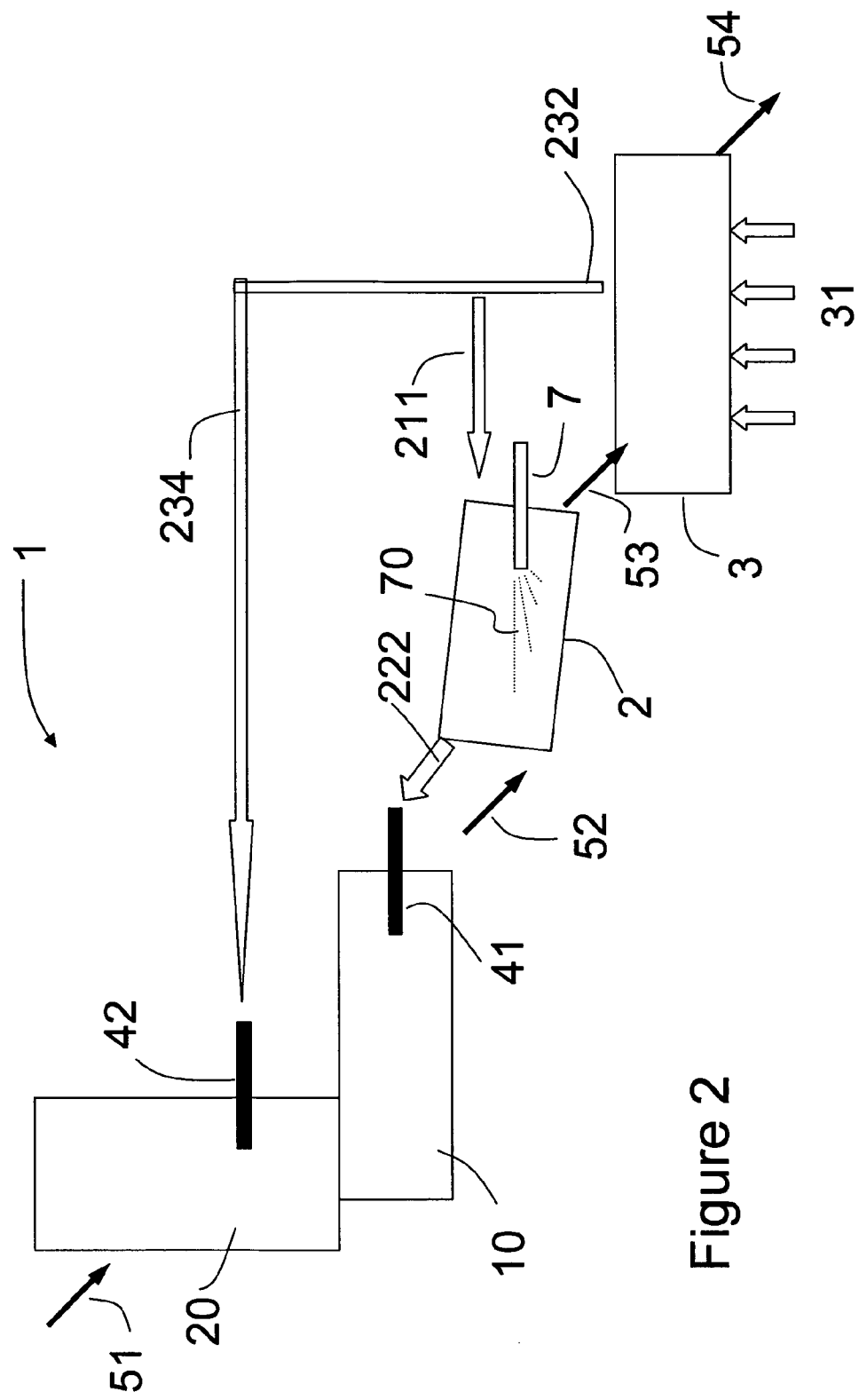
Figure 3:
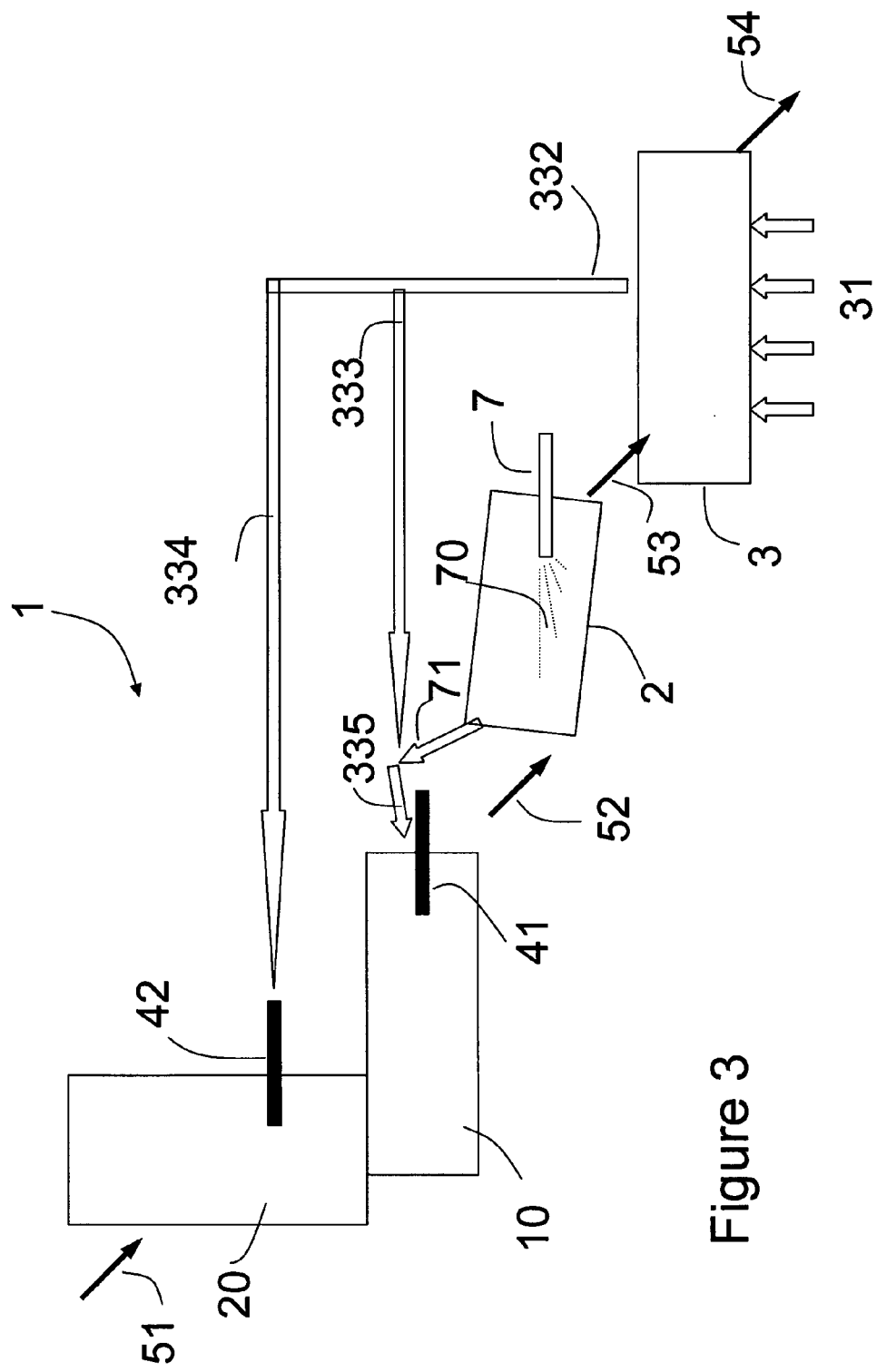

The invention shall be better understood when reading the following description accompanied with the annexed drawings wherein:

FIG. 1 shows a first embodiment of the method in accordance with the invention shown in a facility in accordance with the invention according to a first embodiment, FIG. 2 shows a second embodiment of the method in accordance with the invention implemented in a facility in accordance with the invention according to a second embodiment, FIG. 3 shows a method in accordance with the invention according to a third embodiment implemented in a facility in accordance with the invention according to a third embodiment, FIG. 4 shows a facility in accordance with prior art of which the cooling implements in series a first tubular cooler and a second grate cooler.

We shall first describe the example of FIG. 4 which describes a facility of background art.

This facility comprises a cyclone preheater 20', provided with a burner 42', followed by a rotary furnace 10' provided with a burner 41' intended for the manufacture of cement clinker. The granular materials 51' are supplied to the preheater 20'. In the preheater 20', the materials carry out a portion of the decarbonation. The decarbonation of the materials continues in the rotary furnace 10'. The hot materials 52' are evacuated from the furnace and cooled in a first tubular cooler 2'. The hot materials 53' exiting from the first cooler 2' are cooled in a second cooler 3'.

In the first cooler 2', the materials are cooled by injecting water 70 by the intermediary of means marked 7. The evaporated water is evacuated from the first cooler by a flow 71' directed towards a filtering unit 81'. This vapour is not reintroduced towards the areas for burning of the facility.

The second cooler 3' is supplied by a cold air source 31' in an over-abundant quantity in relation to the air combustion needs of the burners 42' and 41' of the facility. A portion 32', only, of the air heated by the granular materials is directed towards the areas for burning of the facility. A first portion 33' is directed towards the rotary furnace 10', a second portion 34' of the gases being directed towards the preheater 20'. The excess air is evacuated via a discharge flow 80' from the second cooler 3' which requires the implementation of means of ventilation and of a filtering device (not shown).

The invention relates to a method for cooling solid materials, granular, coming from a continuous curing facility. This facility has at least one area for burning 41, 42 a fuel for the curing of the granular materials, such as shown in FIGS. 1 to 3.

According to the method, the curing of the granular materials is carried out in said facility then said cooling of said cured granular materials in two consecutive steps. A first cooling step is implemented in a first cooler 2 in particular of the tubular type, of the facility, and a second cooling step is implemented in a second cooler 3 of the facility, in particular of the grate type.

According to the method:
a cold air source 31 is provided for the cooling of the granular materials, said cold air source 31 supplying directly the second cooler 3 by air blowing,
the air heated by the cured granular materials during the cooling is used as combustion gas for said at least one area for burning 41, 42 of the facility 1.

According to the invention:
the totality of the gases 133, 134; 222, 234; 334, 335 generated by said first cooler 2 and said second cooler 3 are routed towards said at least one area for burning 41, 42 of said curing facility in order to be used as combustion gas, the quantity of cold air blown to said second cooler is adjusted in such a way as to cover but not excessively the air combustion needs of said facility.

Advantageously, the method could also provide to control the temperature of the granular materials at the output of said second cooler 3 by the intermediary of a heat sink 6; 70. Possibly, and such as is shown according to the examples of the figures in particular, the heat sink 6; 70 can be arranged in such a way as to also allow for the controlling of the temperature of the granular materials at the output of the first exchanger 2.

We shall now describe the three examples of FIGS. 1, 2 and 3.

FIG. 1 described an embodiment wherein the heat sink is constituted by an exchanger 6 which cools the air 132 exiting from the second cooler 3 of the grate type, before introducing the air cooled 121 by said exchanger 6 into said first cooler 2, of the tubular cooler type.

FIG. 2 described an embodiment wherein the heat sink is constituted by the water evaporation injected 70 in the first cooler 2, the hot air produced by the second cooler being used as cooling fluid in the first cooler, in combination with the injected water.

FIG. 3 describes an embodiment wherein the heat sink is constituted by the water evaporation injected into the first cooler, the hot air produced by the second cooler 3 not passing through the first cooler 2.

In the three cases, the totality of the gaseous flows exiting from the coolers, first cooler and second cooler, is used in the facility as combustion gas for the curing, and even the calcination of the granular materials.

As such, FIG. 1 shows a curing facility 1 which treats a material 51 and produces a hot granular material 52. This is in particular a facility for the manufacture of cement clinker comprising a cyclone preheater 20 and a rotary furnace 10.

The hot granular material is cooled in two steps, first in the first cooler 2 which is a tubular cooler, the material 53 exiting from the first cooler 2 at an intermediate temperature in order to supply a second grate cooler 3, the material 54 exiting from the second cooler 3 at a final temperature that is compatible for it to be manipulated.

The facility can include several areas for burning such as for example burner 41 on the rotary furnace 10 and burner 42 on the precalcinator (not shown) of the cyclone preheater 20.

The second cooler 3 receives cold air 31 and produces hot air 132, which is subjected to an exchanger 6 wherein it transfers a portion of its heat to a fluid circuit 61. Possibly, this exchanger 6 can be part of a vapour generating device, associated to a turbine for the recovery of energy. The temperature of the flow of hot air 132 can be rather high and in particular greater than 500° C. The utilisation of the energy transmitted to the fluid circuit 61 can reach a high yield.

The hot air cooled 121 (by the exchanger 6) is used to cool the clinker in the first cooler 2 which produces the hot air 122. The lowering of the temperature of the air 132 carried out by the exchanger 6 makes it possible to improve the effectiveness of the cooling of the materials in the first cooler 2.

It is as such permitted to reach the full cooling of the material without increasing the quantity of air blown 31 which is adjusted in such a way as to cover but not excessively the air combustion needs of the facility, and more particularly the air combustion needs of the areas for burning 41, 42. The hot air 122 is divided into two flows 133, 134, one 133 of the flows supplying the area for burning 41 with combustion air, the other flow 134 supplying the area for burning 42 with combustion air.

The FIG. 2 shows a curing facility 1 which treats a material 51 and produces a hot granular material 52. It can in particular be a facility comprising a cyclone preheater 20 and a rotary furnace 10, such as encountered in facilities that manufacture cement clinker.

The hot material 52 is cooled in tow steps, first in a first cooler 2, the material 53 exiting from the first cooler 2 supplying a second cooler 3. The first cooler 2 can be of the tubular type, the second cooler 3 of the grate type.

The curing facility 1 can include several areas for burning 41, 42 fuel, in particular an area for burning 41 on rotary furnace 10, and an area for burning 42 on the precalcinator (not shown) of the preheater 20. The second cooler 3 receives cold air 31 and produces hot air 232, which is divided into two flow, one 234 that will directly supply with combustion air the area for burning 42 of the facility on preheater 20, while the other 211 is conducted through the first cooler 2.

According to this example, water 70 is injected into the first cooler 2, the heat consumed by the evaporation water making it possible to increase the effectiveness of the first cooler 2. It is as such permitted to reach the full cooling of the material without increasing the quantity of air 31 blown to the second cooler 3 which is adjusted in order to cover but not excessively the air combustion needs of the facility. The hot wet air 222 mix of the flow 211 and of the water vapour is used as combustion air in particular on the area for burning 41 of the facility on rotary furnace 10.

Note that this example of FIG. 2 can be modified by directing the flow 234 towards the area for burning 41 of the furnace and the flow 222 towards the area for burning 42 of the cyclone preheater 20.

FIG. 3 shows a curing facility 1 which treats a material 51 and produces a hot granular material 52. It can in particular be a facility comprising a cyclone preheater 20 and a rotary furnace 10.

The hot granular material 52 is cooled in two steps, first in a first tubular cooler 2, the material 53 exiting at an intermediate temperature in order to supply a second grate cooler 3, the material 54 exiting from the second cooler 3 being at a temperature that allows it to be manipulated.

The facility comprises several areas for burning 41, 42 fuel, and in particular one 42 on the precalcinator (not shown) of the cyclone preheater 20 and the other 41 on the rotary furnace 10. The second grate cooler 3 receives cold air 31 and produces hot air 332, which is divided into several flows 333, 334.

One of the flows 334 supplies directly with combustion air the area for burning 42 of the facility on the preheater 20 while the other flow 333 is conducted separately.

According to this example, water 70 is injected by means 7 into the first cooler 2 and the heat consumed by the evaporation water makes it possible to carry out the cooling of the material in said first cooler 2. In the first cooler 2, this injected water 70 constitutes the only cooling fluid and generates water vapour. The water vapour at a high temperature 71 coming from the first cooler 2 is mixed with the flow of air 333, the wet air mixture 335 being used as combustion gas in particular on the area for burning 41.

Note that this example of FIG. 3 can be modified by directing the flow 334 towards the area for burning 41 of the rotary furnace 10 and the wet air flow 335 towards the area for burning 42 of the preheater.

Note that the embodiment of FIG. 2 can be modified by providing an exchanger 6 according to the embodiment of FIG. 1 in order to cool the flow of air 211 in the example of FIG. 2, before it is introduced into the first cooler 2.

Naturally, other embodiments could have been considered without however leaving the scope of the invention defined by the claims hereinafter.

The invention claimed is:

1. Method of cooling granular materials coming from a continuous curing facility (1), having at least one area for burning (41, 42) a fuel for the curing of the granular materials, wherein is carried out the curing of the granular materials in said facility then the cooling of said cured granular materials in two consecutive steps, a first cooling step implemented in a first cooler (2) of the facility and a second cooling step implemented in a second cooler (3) of the facility, method wherein:
   - a cold air source (31) is provided for the cooling of the granular materials, said cold air source (31) supplying directly said second cooler (3) by air blowing,
   - the air heated by the cured granular materials, during the cooling, is used as combustion gas for said at least one area for burning (41, 42) of the facility (1), characterized in that:
   - the totality of the gases (133, 134; 222, 234; 334, 335) generated by said first cooler (2) and said second cooler (3) are routed towards said at least one area for burning (41, 42) of said curing facility in order to be used as combustion gas, without filtration of said gases,
   - the quantity of cold air (31) blown to said second cooler (3) is adjusted in such a way as to cover but not excessively the air combustion needs of said facility (1).

2. Method according to claim 1, wherein the first cooler is a tubular cooler, said second cooler a grate cooler.

3. Method according to claim 1, wherein the temperature of the granular materials (54) at the output of said second cooler (3) is controlled and the temperature of the materials (53) at the output of the first cooler (2) is controlled, by the intermediary of an exchanger (6), and the temperature of the air exiting (132) from the second cooler (3) is lowered by means of said exchanger (6) before introducing the air cooled (121) by said exchanger (6) into said first cooler (2), as cooling air.

4. Method according to claim 3 wherein the air exiting (132) from the second cooler (3) is used in totality as cooling air of the first cooler (2).

5. Method according to claim 1, wherein the temperature of the granular materials (54) at the output of the second cooler (3) is controlled by injection of water in the first cooler (2) and the evaporation water injected (70) into said first cooler (2).

6. Method according to claim 5, wherein the temperature of the granular materials at the output of said first cooler (2) is determined by the adjusting of the flow of injected water (70).

7. Method according to claim 5, wherein, in addition to the injected water (70), the cooling fluid to the first cooler (2) is constituted by a portion (211) of the air exiting from said second cooler (3).

8. Method according to claim 5, wherein the injected water (70) constitutes the only cooling fluid used in the first cooling step to said first cooler (2).

9. Method according to claim 8, wherein the evaporated water (71) of said first cooler (2) is mixed with a portion (333) at least of the heated air exiting from said second cooler (3) before using the wet air mixture (335) as combustion air in said facility (1).

10. Method according to claim 2, wherein the temperature of the granular materials (54) at the output of said second cooler (3) is controlled and the temperature of the materials (53) at the output of the first cooler (2) is controlled, by the intermediary of an exchanger (6), and the temperature of the air exiting (132) from the second cooler (3) is lowered by means of said exchanger (6) before introducing the air cooled (121) by said exchanger (6) into said first cooler (2), as cooling air.

11. Method according to claim 2, wherein the temperature of the granular materials (54) at the output of the second cooler (3) is controlled by injection of water in the first cooler (2) and the evaporation water injected (70) into said first cooler (2).

12. Method according to claim 6, wherein, in addition to the injected water (70), the cooling fluid to the first cooler (2) is constituted by a portion (211) of the air exiting from said second cooler (3).

13. Method according to claim 6, wherein the injected water (70) constitutes the only cooling fluid used in the first cooling step to said first cooler (2).

14. Continuous curing or calcination facility (1) having least one area for burning (41, 42) a fuel for the curing of the granular materials wherein the granular materials are cooled in two consecutive steps, a first cooling step implemented in a first cooler (2) of the facility and a second cooling step implemented in a second cooler (3) of the facility, said installation (1) having a cold air source (31) for the cooling of the materials supplying directly said second cooler (3) characterized in that it has:
   - gas ducts making it possible to route the totality of the hot gases generated (133, 134; 222, 234; 334, 335) by said first cooler (2) and said second cooler (3) towards said at least one area for burning (41, 42) of said facility (1), without filtration of said gases,
   - means for adjusting the quantity of cold air blown to said second cooler (3) in such a way as to cover but not excessively the air combustion needs of said facility.

15. Installation according to claim 14, wherein the first cooler is a tubular cooler, said second cooler a grate cooler, supplied by the cold air source (31).

16. Installation according to claim 14, having an exchanger (6) able to allow for the control, and even the adjusting of the temperature of the granular materials at the output of said second cooler (3), said exchanger (6) making it possible to cool the gases (132) exiting from said second cooler (3) before using the gases (121) cooled by the exchanger (6) to said first cooler (2) as cooling air.

17. Installation according to claim 14 having means (7) for injecting water into said first cooler (2) able to allow for the control, and even the adjusting of the temperature of the granular materials at the output of said second cooler (3).

18. Installation according to claim 15, having an exchanger (6) able to allow for the control, and even the adjusting of the temperature of the granular materials at the output of said second cooler (3), said exchanger (6) making it possible to cool the gases (132) exiting from said second cooler (3) before using the gases (121) cooled by the exchanger (6) to said first cooler (2) as cooling air.

19. Installation according to claim 15 having means (7) for injecting water into said first cooler (2) able to allow for the control, and even the adjusting of the temperature of the granular materials at the output of said second cooler (3).

20. Installation according to claim 16 having means (7) for injecting water into said first cooler (2) able to allow for the control, and even the adjusting of the temperature of the granular materials at the output of said second cooler (3).

* * * * *